UNITED STATES PATENT OFFICE.

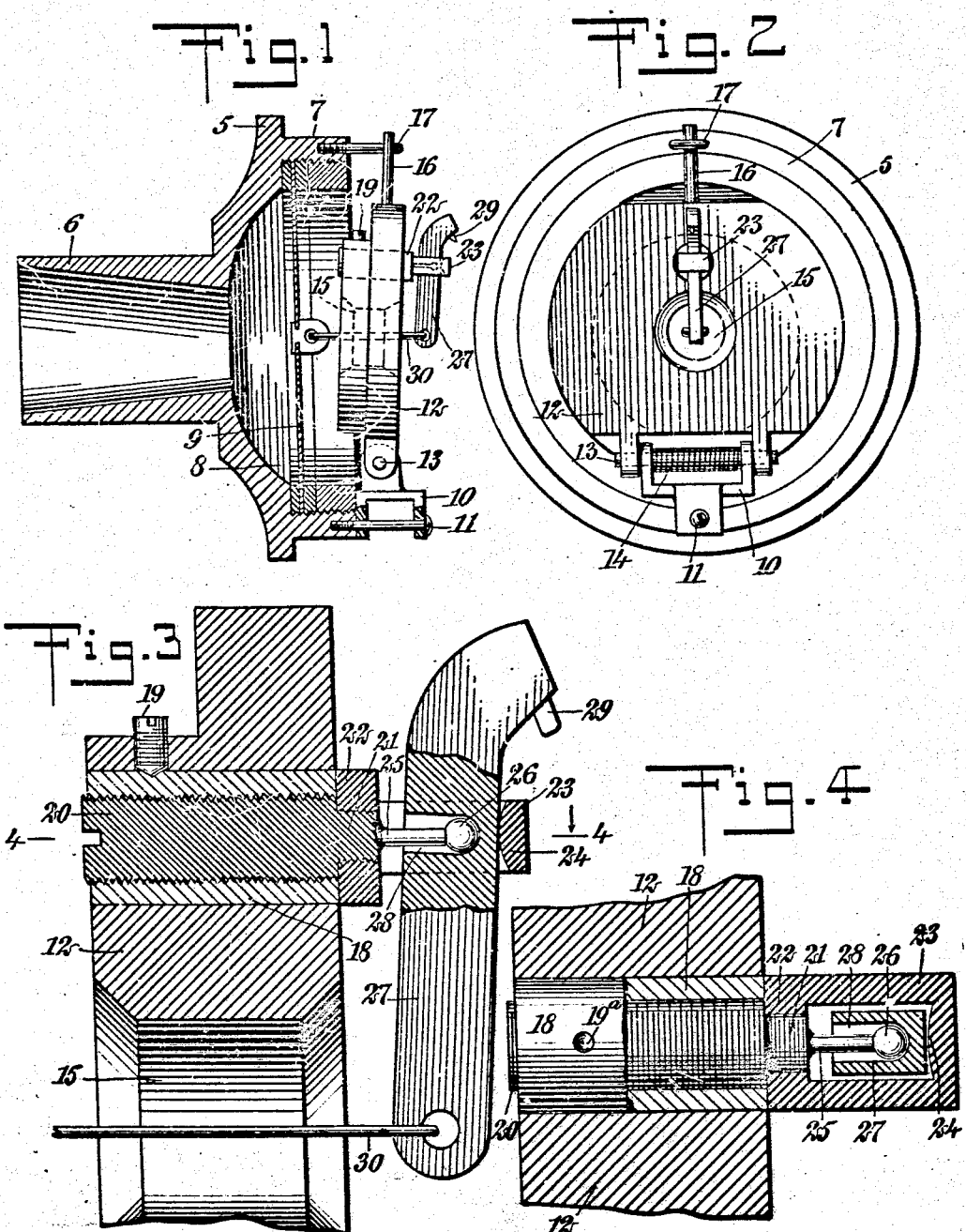

RICHARD BARTHOLOMEW SMITH, OF NEW YORK, N. Y., ASSIGNOR TO INDESTRUCTIBLE PHONOGRAPHIC RECORD CO., OF BROOKLYN, NEW YORK.

PHONOGRAPHIC REPRODUCER.

936,826.  Specification of Letters Patent.  Patented Oct. 12, 1909.

Application filed March 1, 1909. Serial No. 460,550.

*To all whom it may concern:*

Be it known that I, RICHARD BARTHOLOMEW SMITH, a subject of the King of Great Britain, and a resident of the city of New York, borough of Manhattan, in the county and State of New York, have invented a new and Improved Phonographic Reproducer, of which the following is a full, clear, and exact description.

My invention relates primarily to phonographic reproducers, but may also be used in connection with phonographic records and generally in all relations where there is a stylus lever controllable by, or employed for the purpose of controlling, a diaphragm in order to record or reproduce sounds.

More particularly stated, my invention comprehends a stylus lever balanced upon a pin by aid of a single ball joint, thus reducing friction to a minimum and enabling the lever to be more easily retained in balance.

My invention further contemplates a stirrup which encircles the stylus lever and joint above mentioned, in order to hold the stylus lever in proper working relation to the ball.

My invention still further contemplates means whereby the stylus lever, though encircled by said shoe and fitting the same neatly, turns upon the ball as a center and carries with it, as it turns, the stirrup.

I find that a stylus lever can be given great freedom of movement in various directions, and that the friction of the lever and parts immediately associated therewith, is greatly reduced by the mechanism herein described, and also that the use of this mechanism tends to improve the quality richness of the tones reproduced or recorded by the device. Of course, it would be an easy matter to give a stylus lever a considerable range of idle movement, but this is not the sole purpose of my mechanism. What I seek more particularly to do is to give the stylus lever a wide range of movement, whereby it may perform a large variety of movements in different directions and varying considerably in character, these movements, however, being faithfully transmitted to or from the diaphragm, as the case may be, and thereby caused to vary, for their betterment, the tones being recorded or reproduced.

While it is impracticable to show and describe the multifarious forms which may be assumed by my invention, I show a single representative form, this being sufficient to enable persons skilled in the art to understand the principles involved and to make and use the construction.

Reference is to be had to the accompanying drawings forming a part of this specification, in which similar characters of reference indicate corresponding parts in all the figures.

Figure 1 is a substantially central vertical section through a phonographic reproducer made in accordance with my invention, this view disclosing a movable weight and a stylus lever pivotally mounted relatively to said weight by aid of my improved ball joint; Fig. 2 is a rear elevation of the reproducer; Fig. 3 is an enlarged fragmentary section through the upper portion of the reproducer, showing the stylus lever and my improved mounting for the same; and Fig. 4 is a fragmentary section substantially upon the line 4—4 of Fig. 3.

At 5 is a dome-like casing which is provided with a neck 6 for facilitating the attachment of a horn. The casing 5 is provided with an annular portion 7 and with a compartment 8 in which is mounted a diaphragm 9. A bracket 10 is, by aid of a pin 11, mounted upon the annular portion 7. A weight 12 having generally an annular form is journaled by aid of a pin 13 upon the bracket 10. A spiral spring 14 connected with the bracket 10 and with the weight, gives the weight more or less tension relatively to other parts. The weight is provided with a central opening 15. Mounted upon the weight and projecting radially therefrom is a pin 16 which engages a hook 17, thus serving as a limiting stop for motions of the weight 12.

A sleeve 18 extends entirely through the weight 12 and is secured rigidly thereto by aid of a set screw 19 which fits into a bearing 19ª, this bearing being shown in Fig. 4. The sleeve 18 is threaded internally, and extending entirely through it is a bolt 20 which is provided with a reduced portion 21 also threaded, and revolubly fitted upon this reduced portion is a collar 22 threaded internally and provided with a stirrup 23 integral with it.

The stirrup 23 is provided internally with a convex surface 24. Mounted rigidly upon the reduced portion 21 of the bolt 20 is a neck 25 carrying a head 26, the latter being spherical and polished. A stylus lever is shown at 27 and is provided with a hole 28 extending about three quarters of the distance through it and terminating in a rounded bottom, as will be understood from Figs. 3, 4. The stylus lever engages the convex surface 24, which serves as a limiting stop for it, the ball 26 fitting neatly into the bottom of the hole 28 and preventing undue play of the stylus lever.

At 29 is a jewel which is mounted upon the stylus lever and is used in the manner heretofore known for engaging a rotating cylinder or disk. A link 30 connects the stylus lever with the diaphragm 9. The stylus lever is free to turn in two planes crossing each other, one coinciding with the axis of the threaded bolt 20 and its neck 25, the other plane crossing the axis just mentioned. These two movements in different planes are what might be termed "general swinging movements". Aside from this, the stylus lever 27 has a local rocking movement upon the ball 26 as a center.

The stirrup 23 has a slight turning movement, owing to the fact that the collar 22 does not fit tightly upon the reduced portion 21 of the bolt 20, and to the additional fact that the collar 32 is not ordinarily tightened against the sleeve 18 or against the weight 12. My purpose in leaving the collar 22 slightly loose is to facilitate the freedom with which the stirrup can turn, and in this way I increase the freedom of action of the stylus lever. I call especial attention to the slight rocking movement, above referred to, of the stylus lever 27 upon the ball 26 as a center. This last-mentioned rocking movement is quite small in degree, owing to the fact that it is limited by the stirrup 23, as will be seen from Fig. 4. Such movement as thus takes place, however, occurs with great freedom, owing to the fact that the stylus lever 27 can easily turn upon its general longitudinal axis and also to the fact that such turning movement is facilitated by the convex bottom 24 of the stirrup.

I have found that the particular depth given to the hole 28 might modify in a great measure the character of the work done by the stylus lever. Where stylus levers of ordinary form are employed, the hole 28 should be quite deep, extending, in the particular instance here shown, considerably past the central axial line of the stylus lever. In doing this, the ball 26, in exerting pressure against the stylus lever, tends to maintain the stylus lever in true position.

It will be noted that the portion of the ball 26 sustaining the pressure is, by the depth of the hole 28, brought to a point comparatively close to an imaginary line connecting the two points where pressure is applied on the ends of the stylus lever. This fact tends to steady the rocking action of the lever in a plane coinciding with the axis of the bolt 20. The pull of the link 30 upon the diaphragm 9 and upon the stylus lever 27 tends to maintain the stylus lever in proper general position when the jewel 29 is pressed upon by the cylinder or disk, so that generally the stylus lever is in stable equilibrium, as well as in its normal position, in case no force is applied to move this stylus lever sidewise. If, however, there be, for any reason, a slight tendency to rock the stylus lever upon the ball 26 as a center, in a plane crossing the general length of the stylus lever, the latter is free to yield and as soon as the disturbing force is removed the lever tends to assume its normal position.

While I show the stylus lever 27 as conveniently supported by aid of the weight 12, I do not limit myself to this particular arrangement, for obviously the stylus lever can be supported in any manner known in this art. Neither do I limit myself to the particular construction shown for the stylus lever nor for the parts immediately associated with it.

Having thus described my invention, I claim as new and desire to secure by Letters Patent:

1. The combination of a casing, a diaphragm mounted therein, a weight movable relatively to said casing, a ball connected with said weight and supported thereby, and a stylus lever provided with a hole having a hemispherical bottom, said hole being fitted over said ball, and a link connected with said stylus lever and with said diaphragm.

2. A device of the character described, comprising a weight, a neck connected therewith and extending a little therefrom, a ball mounted upon said neck, and a stylus lever provided with a hemispherical bearing surface engaging said ball so as to swivel the same, and means for preventing said stylus lever from moving away from said ball.

3. The combination of a stylus lever, a weight relatively to which said stylus lever is journaled, and a stirrup movable relatively to said weight and encircling said stylus lever.

4. The combination of a weight, a member extending therefrom and provided with a bearing surface, a lever engaging said bearing surface and adapted to rock relatively to said weight, and a stirrup carried by said weight and movable relatively to the same, said stirrup encircling said stylus lever.

5. The combination of a supporting member, a stylus lever journaled relatively to the same, a collar encircling a portion of said supporting member and movable relatively to said portion, and a stirrup connected with said collar and encircling said stylus lever.

6. The combination of a stirrup provided with a convex surface, a stylus lever engaging said convex surface of said stirrup, and a member engaging said stylus lever and provided with a portion serving as a bearing upon which said stylus lever may turn.

7. The combination of a stylus lever provided with a hole extending nearly through it, a ball mounted upon a support and extending to the bottom of said hole, and means for connecting said stylus lever to a diaphragm.

8. The combination of a stylus lever, means for connecting the same to a diaphragm, a stirrup encircling said stylus lever, and a support carrying said stirrup, said stirrup being movable relatively to said support.

9. In a device of the character described, the combination of a stylus lever having adjacent to its ends two points of suspension and intermediate these ends having a hole extending into said stylus lever to a point quite close to an imaginary straight line joining said points of suspension at the ends of said stylus lever, and a member provided with a ball extending into said hole for the purpose of enabling said stylus lever to turn thereupon.

10. The combination of a weight provided with a projecting member extending therefrom, a stylus lever journaled upon said member thus projecting, and a stirrup carried by said weight and encircling said stylus lever.

11. The combination of a weight, a sleeve extending entirely through the same, means for securing said sleeve rigidly in relation to said weight, a threaded bolt extending through said sleeve and provided with a reduced portion, a neck mounted upon said reduced portion and provided with a head having a spherical form, a stylus lever provided with a hole into which said head fits, and means for preventing said stylus lever from leaving said head.

12. The combination of a weight, a sleeve extending therethrough, a bolt extending through said sleeve, a stylus lever, and means carried by said bolt for engaging said stylus lever and forming therewith a ball joint.

In testimony whereof I have signed my name to this specification in the presence of two subscribing witnesses.

RICHARD BARTHOLOMEW SMITH.

Witnesses:
WALTON HARRISON,
JOHN P. DAVIS.